Feb. 21, 1950     E. W. BARBEE     2,498,196
CONTROL MECHANISM FOR METERING GASES TO FLUIDS
Filed April 23, 1947
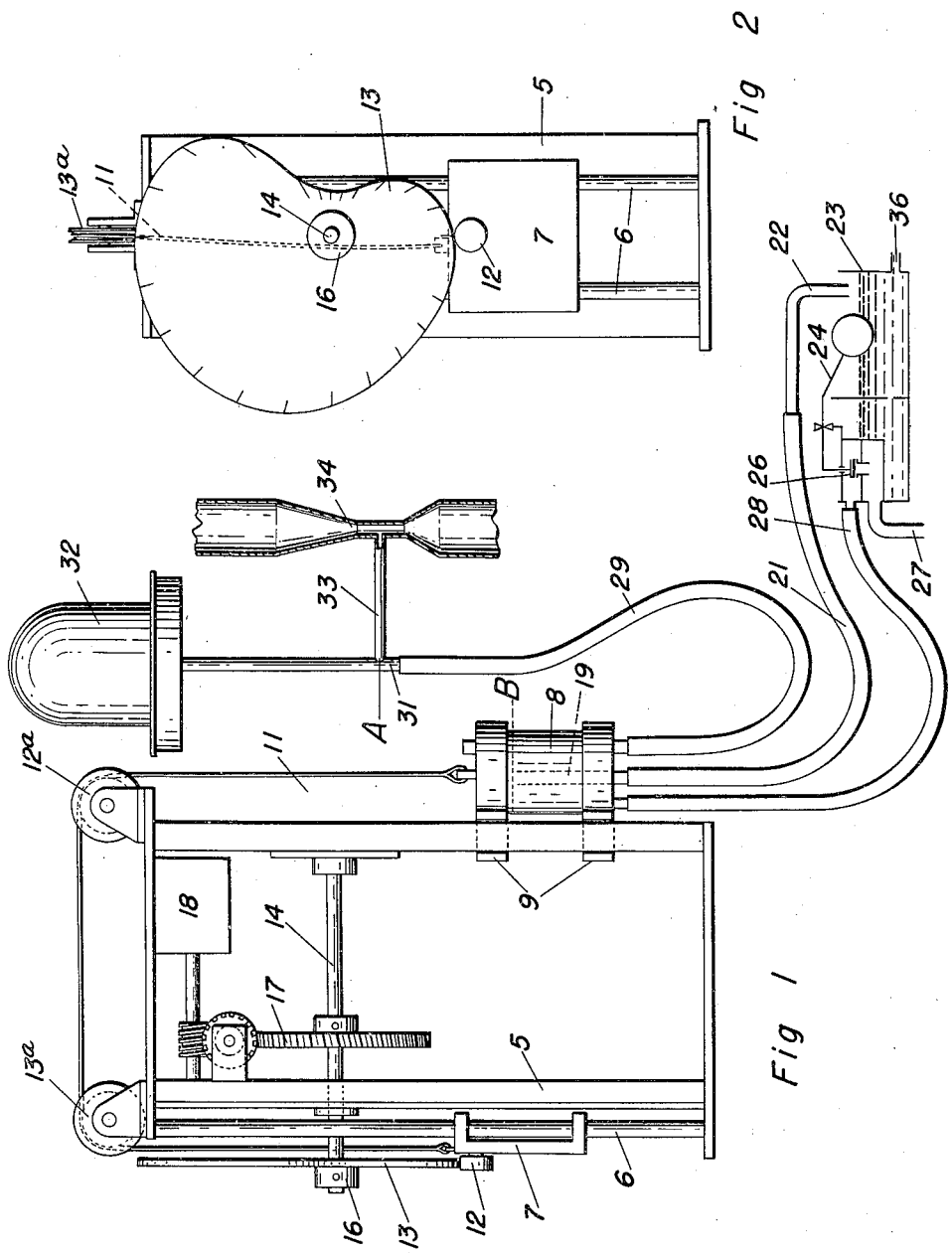
INVENTOR.
Edwin W. Barbee
BY
Att'y Patented Feb. 21, 1950

2,498,196

UNITED STATES PATENT OFFICE 2,498,196

CONTROL MECHANISM FOR METERING GASES TO FLUIDS

Edwin W. Barbee, San Carlos, Calif.

Application April 23, 1947, Serial No. 743,282

1 Claim. (Cl. 210—28)

This invention relates to improvements in machines for controlling the flow of gases over a definite period of time.

The principal object of this invention is to produce a device which may be attached to any ordinary system, wherein gases are to be distributed in quantities prorated in accordance with the flow of other liquids.

A further object is to produce a device of this character which is easy to manipulate, economical to manufacture and one which will not require constant care.

A still further object is to produce a device of this character wherein the regulating member takes the form of a program disc which may be changed from time to time in accordance with changed conditions without shutting down the apparatus for any appreciable length of time.

Other objects and advantages will be apparent during the course of the following description.

In the accompanying drawings forming a part of this specification and in which like numerals are employed to designate like parts throughout the same, Fig. 1 is a side elevation of my device showing the water supply diagrammatically, and Fig. 2 is a front elevation of Fig. 1 looking from the left of the drawing.

In the feeding of gases it is often necessary to deliver a predetermined amount of gas for a specific volume, as for example, in the flow of water in mains, it is necessary to feed a definite quantity of chlorine gas to the water. This addition of chlorine gas must be regulated at all times so that the proper amount will be mixed with the water flowing from the reservoir or tank in an amount sufficient to thoroughly disinfect the water and yet an amount which will not be noticeable as far as taste is concerned.

As the demands of a water system are constantly varying, it must, of course, be understood that the regulation of the flow of chlorine to the water is an exacting process and one requiring constant regulation. It has been determined that the average flow from a reservoir or tank will be very uniform for definite periods over a considerable period of time by making weekly graphs of the flow; for example, by starting at 2:30 A. M., the flow begins to rise and continues to do so until around 12 M., when it has reached its greatest volume, and the flow will then begin to decrease until around 5 o'clock P. M., when it will again increase slightly and gradually decrease again toward midnight.

When a system to which my device is to be attached has been in operation for some time it is possible to ascertain the exact flow from the system and to make a program disc which will actuate my apparatus in exact accordance with the demands of the system.

By referring to Fig. 1, it will be noted that a frame designated as a whole by the numeral 5 has positioned on the front thereof a pair of rods 6, which form slides upon which a slider 7 moves.

Mounted upon the opposite side of the framework from the slider is a water container 8 which is slidably held by guides 9 to the frame and is attached by a cable 11 passing over pulleys 12$^a$ and 13$^a$ mounted on top of the frame to the slider 7.

The slider 7 has a roller 12 against which the periphery of a program disc 13 engages. This program disc is mounted upon the shaft 14 through a bushing 16. This shaft 14 is rotated through suitable gearing designated as a whole by the numeral 17 driven by a synchronous motor 18.

The result of this construction thus far described is that as the motor 18 revolves the gearing, the shaft 14 will be slowly rotated and at a definite speed; therefore, the program disc 13, in rotating, will have its periphery engaged by the roller 12, which action will result in an up and down movement of the slider 7, which is in turn connected to the water container 8, so that as the slider 7 moves up and down, a corresponding movement will be transmitted to the water container.

The water container has a pipe 19 extending upwardly thereinto and having an open end within the container, its lower end being connected by a flexible pipe 21 to a discharge nozzle 22, which is discharged into a tank 23.

Within this tank is a float valve arrangement 24 which actuates a valve 26, permitting water from a supply line 27 to pass from the supply line to a flexible pipe 28 connected to and discharging into the water container 8.

A flexible pipe 29 also communicates with the bottom of the water container and to a pipe 31 leading to a gas chamber 32 and to an injector pipe 33 connected to the venturi 34, as for example, a water main.

A constant discharge pipe 36 operates to control the height of the water in the tank 23.

The operation of my device is as follows:

Assuming that we have a known flow of water, that is for a particular period of time, and desire to treat that water with a given quantity of chemicals, such as chlorine gas, and assuming that the parts of the machine are in the position of Fig. 2, then the machine will be in a position to deliver, for example, a certain quantity of gas and then as the program disc revolves in a counter-clockwise direction, this condition will change and the pressure will decrease due to the fact that the distance of the periphery of the program disc from its center is increased, and therefore, it is causing the roller 12 and the slide 7 to move downwardly, and through the medium of the cable 11, to raise the water container 8.

As the container 8 is elevated, the water level B within the container will approach the center line A of the injector pipe 33. This raising of the water level in the water container B will lower the hydrostatic head between the points A and B and, therefore, will decrease the inches of water suction, and consequently, the amount of gas which will pass through the gas chamber 32. This gas chamber is really a metering device using an orifice, the flow of gas depending upon the suction applied to the gas orifice meter.

The action of the water container is as follows:

In order to maintain a supply of water in the water container a supply line 27 delivers water through a float control valve 26, through the pipe 28, and into the water container 8.

As soon as the water has reached the level B it will overflow through the pipe 19, flexible pipe 21, and discharge into the tank 23, from which point it escapes through a pipe 36, which pipe has a definite constant flow value.

Water from the water container will also pass through the pipe 29 and raise up to the center line of the injector pipe 33 through the suction effect of the venturi 34. At the same time gas will be pulled downwardly from the gas chamber 32 and will mix with the water in the pipe 33, which gas and water will discharge into the water main.

The float valve arrangement 24 will actuate the valve 26 so as to maintain a constant level in the tank 23. Should the overflow through the pipe 21 increase, then the ball 24 will rise and shut off the supply to the water container.

If the water passing through the pipe 29 increases in volume through increased suction, then the ball 24 will drop, opening the valve 26 wider and permitting more water to enter the water container. The water passing through the pipe 29 is known as makeup water, and it is the water which is combined with the chlorine previous to discharging the same into the main line; therefore, the raising and lowering of the water container so that the points A and B move toward each other and away from each other will very gradually control the amount of vacuum across the orifice in the metering gas chamber and that this raising and lowering can be controlled through the use of a program disc, the periphery of which is plotted to coincide with the average requirements of the system to which it may be attached.

It will thus be seen that my device will accomplish all of the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

In a device of the character described, a supporting frame, vertical slideways formed on opposite sides of said supporting frame, a water container mounted on one of said slideways for vertical movement therealong, a counterbalancing slider mounted on the other slideway for vertical movement therealong, guide pulleys mounted on said frame at the tops of said slideways, a cable connecting said water container and slider and trained over said pulley, a shaft extending transversely of said frame and projecting above said slider, a roller mounted on said slider, a timing cam fixed on said shaft and engaging on said roller, a constant speed drive for said shaft, a gas chamber, a pipe connecting said gas chamber and said water container, an overflow pipe extending into said water container and terminating adjacent to the top thereof, a tank into which said overflow pipe discharges, said tank having a restricted outlet, a supply pipe leading to said water container, a valve controlling said supply pipe, a float in said tank controlling said valve, a water pipe including a venturi, and a branch pipe extending laterally from said first pipe to the Venturi throat.

EDWIN W. BARBEE.

REFERENCES CITED

The following references are of record in the file of this patent:

UNITED STATES PATENTS

| Number | Name | Date |
|---|---|---|
| 2,243,826 | Nielson et al. | May 27, 1941 |
| 2,423,379 | Geiser | July 1, 1947 |